(12) United States Patent
Edwards (10) Patent No.: US 8,654,725 B2
(45) Date of Patent: *Feb. 18, 2014

(54) TELECOMMUNICATIONS NETWORK

(75) Inventor: Keith Russell Edwards, Hutton (GB)

(73) Assignee: Rockstar Consortium US LP, Plano, TX (US)

( * ) Notice: Subject to any disclaimer, the term of this patent is extended or adjusted under 35 U.S.C. 154(b) by 217 days.

This patent is subject to a terminal disclaimer.

(21) Appl. No.: 13/173,875

(22) Filed: Jun. 30, 2011

(65) Prior Publication Data

US 2011/0310776 A1    Dec. 22, 2011

Related U.S. Application Data

(63) Continuation of application No. 12/549,584, filed on Aug. 28, 2009, now Pat. No. 7,983,202, which is a continuation of application No. 10/320,574, filed on Dec. 16, 2002, now Pat. No. 7,583,619.

(51) Int. Cl.
*H04W 4/00* (2009.01)

(52) U.S. Cl.
USPC ............ 370/329; 370/279; 370/280; 370/281

(58) Field of Classification Search
None
See application file for complete search history.

(56) References Cited

U.S. PATENT DOCUMENTS

| | | | |
|---|---|---|---|
| 4,539,706 A | 9/1985 | Mears et al. | |
| 5,353,332 A | 10/1994 | Raith et al. | |
| 5,475,677 A * | 12/1995 | Arnold et al. | ................. 370/280 |
| 5,577,101 A | 11/1996 | Bohm | |
| 5,850,593 A | 12/1998 | Uratani | |
| 5,881,369 A | 3/1999 | Dean et al. | |
| 6,269,086 B1 | 7/2001 | Magana et al. | |
| 6,556,830 B1 | 4/2003 | Lenzo | |
| 6,766,170 B1 | 7/2004 | Aretz et al. | |
| 7,054,623 B1 | 5/2006 | Cushway | |
| 7,096,022 B2 | 8/2006 | Gao et al. | |
| 7,428,268 B2 * | 9/2008 | Shen et al. | ..................... 375/267 |
| 7,496,074 B2 | 2/2009 | Hepler et al. | |

(Continued)

FOREIGN PATENT DOCUMENTS

| | | |
|---|---|---|
| EP | 0689303 A1 | 12/1995 |
| EP | 1079548 A1 | 2/2001 |
| WO | 00/24141 A2 | 4/2000 |

*Primary Examiner* — Robert Wilson
(74) *Attorney, Agent, or Firm* — Christopher & Weisberg, P.A.

(57) ABSTRACT

The present invention relates generally to a cellular telecommunications network. Each cell has at least one base station for sending messages on a downlink of a Frequency Division Duplex (FDD) to end user equipments within the cell and for receiving messages on an uplink from end user equipments within the cell. Other end user equipment located within the cell which have no or only poor communication directly with the base station over the FDD communicate with the base station indirectly via an intermediate end user equipment, such as a mobile telephone. The intermediate end user equipment includes an FDD transceiver and a Time Division Duplex (TDD) transceiver and an FDD/TDD interface. The intermediate end user equipment receives signals from the base station over the FDD using the FDD transceiver and relays them via the FDD/TDD interface and the TDD transceiver towards a relevant one of the other end user equipments over a TDD and receives signals from the other end user equipment over the TDD using the TDD transceiver and relays them via the FDD/TDD interface and the FDD transceiver to the base station over the FDD, The network provider thereby improves capacity and coverage by utilizing TDD channels without having to deploy and TDD infrastructure.

25 Claims, 3 Drawing Sheets

(56) References Cited

U.S. PATENT DOCUMENTS

| | | |
|---|---|---|
| 7,515,568 B2 | 4/2009 | Bonta |
| 7,583,619 B2 * | 9/2009 | Edwards ............... 370/279 |
| 7,720,169 B2 * | 5/2010 | Reuven et al. ............ 375/267 |
| 7,983,202 B2 * | 7/2011 | Edwards ............... 370/279 |
| 8,149,945 B2 * | 4/2012 | Kwon et al. ............ 375/267 |
| 2002/0183038 A1 | 12/2002 | Comstock et al. |
| 2003/0108016 A1 * | 6/2003 | Bonta .................. 370/338 |
| 2004/0014447 A1 | 1/2004 | Hepler et al. |
| 2011/0310776 A1 * | 12/2011 | Edwards ............... 370/279 |
| 2012/0051301 A1 * | 3/2012 | Saito et al. ............ 370/329 |

* cited by examiner

TELECOMMUNICATIONS NETWORK

CROSS-REFERENCE TO RELATED APPLICATION

This application is a continuation of U.S. patent application Ser. No. 12/549,584, filed Aug. 28, 2009, now U.S. Pat. No. 7,983,202 entitled TELECOMMUNICATIONS NETWORK, which is a continuation of U.S. patent application Ser. No. 10/320,574, filed Dec. 16, 2002, now U.S. Pat. No. 7,583,619, issued on Sep. 1, 2009, entitled A WIRELESS ACCESS COMMUNICATIONS NETWORK, the entirety of which both are incorporated herein by reference.

STATEMENT REGARDING FEDERALLY SPONSORED RESEARCH OR DEVELOPMENT n/a

FIELD OF THE INVENTION

This invention relates to telecommunications networks, and in particular to a method and system for improving the coverage of a wireless telecommunications network having a Frequency Division Duplex (FDD) infrastructure.

BACKGROUND OF THE INVENTION

A geographical area covered by a cellular wireless telecommunications network may be separated into a patchwork of smaller geographical areas or cells, which are each served by a base station. Each base station communicates with end user equipments, which subscribe to the network operator of the network and which are located within the cell served by the base station. A network controller coordinates the transmission of messages, comprising for example voice or data, via the base stations. For optimum coverage over a cell, the base station may transmit and receive messages over one or more Frequency Division Duplexes (FDDs). In a FDD a first channel at a first frequency is used constantly as a downlink, for carrying messages from the base station to user equipments within the cell. A second channel, at a different frequency from the first is used constantly as an uplink for carrying messages from the user equipments within the cell to the base station.

However, there can be a problem that some user equipments within the cell may not be able to communicate with the base station over the FDD because for example, there is an obstacle between the base station and the end user equipment. For example, it may be that user equipments located on an upper floor of a building can communicate with the base station, whereas user equipments located on a lower floor or in the basement of the building cannot communicate with the base station. One way of solving this problem is to install repeater units adjacent to regions of a cell where coverage is poor. The repeater units, receive messages from the base station and re-transmit them to the user equipments and receive messages from the user equipments and retransmit them to the base station. As the repeaters transmit and receive the messages at a location closer to the user equipments than the base station, user equipments in the poor coverage region of the cell have a good chance of establishing communication with the base station via the repeater. However, repeater units are relatively expensive and the deployment of repeaters in regions with high user density, such as urban environments, can be prohibitively expensive because of the shortage of sites for the location of repeater units and the high rental costs for such locations. Also, the deployment of repeater units in regions of low user density, such as rural environments, is not cost effective as the numbers of user equipments in cell regions with poor coverage is generally too low.

Investigations have also been carried out to try to improve capacity within cells. One way to do this is to use one or more base station equipments operating in Time Division Duplex (TDD) mode in addition to the FDD mode. In the TDD mode the same frequency channel is used for communications from the base station to the user equipments and from the user equipments to the base station, with the direction of transmission of messages on the channel varied in a controlled way so that the transmission of messages at any given time is one way.

However, TDD is not ideally suited for wide area coverage. In order to improve coverage within the poor coverage regions of a cell having a TDD infrastructure, relatively simple TDD relays can be deployed. The TDD relays may include relay units specifically deployed by the network operator of user equipments and/or end user equipments equipped with a TDD relay capability. Simple relays and user equipments can be used because TDD is ideally suited to relay because the same channel can be used for receipt and re-transmission of the relayed message, with the receipt and retransmission separated in time so that the TDD for the relay has changed from a receive mode to a transmit mode.

The situation is more complicated where the base station has a FDD infrastructure. This is because for an FDD repeater the uplink and downlink channels must be reversed in frequency so as to ensure that a standard end user equipment can be used, This frequency swapping creates the potential for self interference where the repeater transmitter may cause interference to the repeater receiver. Alternatively, the FDP repeater can map the FDD system into another spectrum allocation to avoid self interference, however, this requires the end user equipment to be multi-band and still the repeater may be interfered with or cause interference to other systems. Therefore, it has been suggested in order to extend high bit data rate FDD coverage to the periphery of a cell, which periphery can support only low bit data rate FDD coverage, that a static relay node may be deployed by the network operator at the border between the high bit data rate coverage area and the periphery of the cell. The static relay node would receive a message at the high bit data rate over a base station FDD and relay it, at the high bit data rate, on a TDD towards its destination. Although FDD/TDD repeaters will be less prone to the self interference effects (the TDD onwards transmiHssion will be, at worst, in an adjacent band, rather than in-band as is the case for co-channel FDD) they suffer similar disadvantages to FDD only repeaters. Fixed repeater installations of all types are likely to attract similar site location and rental issues.

SUMMARY OF THE INVENTION

The present invention relates generally to a telecommunications network, in particular a wireless cellular telecommunications network including a base station, an intermediate end user equipment and an other end user equipment. The intermediate end user equipment includes a FDD/TDD relay for relaying data between a FDD between the base station and the intermediate end user equipment and a TDD between the intermediate end user equipment and the other end user equipment.

In accordance with a first aspect of the invention, there is provided a telecommunications network comprising: a base station; an intermediate user equipment; and an other user equipment; the intermediate user equipment having a frequency division duplex (FDD) transceiver for communicating directly with said base station over a FDD, a time division duplex (TDD) transceiver for communicating with the other user equipment over a TDD and an interface for interfacing said FDD and TDD to establish a communication link between the base station and the other user equipment.

In accordance with a second aspect of the present invention there is provided an intermediate end user equipment for use in a telecommunications network, which network also includes a base station and an other end user equipment, wherein the intermediate end user equipment includes: a FDD transceiver for communicating directly with the base station over a FDD; a TDD transceiver for communicating over a TDD with the other end user equipment; and an interface for interfacing said FDD and TDD to establish a communication link between the base station and the other user equipment.

The first and second aspects of the present invention provide the advantage of enabling improved capacity and coverage within a network having a primarily FDD infrastructure, without the network provider having to deploy additional relay or repeater units in poor network coverage areas. For example, an end user having a mobile telephone and a mobile computing device may find themselves working in a building where network coverage is good upstairs but poor downstairs. In this case the end user could leave their mobile phone in a transceiving mode in an upstairs room, so that it could act as an intermediate end user equipment for a mobile computing device being used in a downstairs room, or vice versa. In an office building where some workers in the basement cannot communicate directly with a base station, end user equipments on the upper floors could be used as intermediate end user equipments so that destination or terminal (ie. other) end user equipments in the basement could communicate indirectly with the base station via TDD communications with the intermediate end user equipments. In the above examples, it may be that the destination or terminal end user equipments can only communicate with the base station over a low bit data rate communication whereas communication via an intermediate end user equipment may enable a high bit data rate communication to be achieved.

Also, the present invention enables unpaired TDD spectrum, licensed by the network provider and which is largely unused, to be used in a network with a primarily FDD infrastructure. The present invention enables the utilization of TDD spectrum without the deployment of TDD infrastructure by the network provider In addition it may be possible to share spectrum with other operators or use unlicensed (license exempt) spectrum since the probability of interference is likely to be low and interference limiting protocols, such as 'listen before talk' or central scheduling could be employed.

In order to prevent interference between messages sent over the TDDs within the network, the FDD/TDD interface may include a synchronization unit for synchronizing the transmission of frames over the TDD with the transmission of frames over the FDD. Then a network controller, for example a base station controller or Radio Node Controller (RNC) may allocate TDD resource to intermediate user equipments. Where the FDD and TDD frames are synchronized, if a first intermediate end user equipment is allocated a first set of time slots over which to transmit over a TDD channel and a second intermediate user equipment is allocated a different set of time slots over which to transmit over the TDD channel, then the TDD transmissions made by the first and second intermediate end user equipments will not generate interference. In order to intelligently re-use TDD resource within a cell the network controller may allocate TDD resource within the cell to intermediate user equipments dependent on the location of the intermediate user equipments.

The user equipments may be mobile equipments, such as mobile telephones, mobile computing devices or Personal Digital Assistants (PDAs). Alternatively, the end user equipments may be nomadic equipments, such as computing devices, for example, lap top computers that are generally static when in use but which do not always have the same location.

In order to reduce the complexity of the FDD/FDD interface in the intermediate end user equipment the frames transmitted over the TDD may be configured to have the same structure as frames transmitted over the FDD. Also, the same coding and decoding scheme and the same modulation technique may be used for data transmitted over the TDD as is used for the FDD. This enables mapping of messages from timeslots in a FDD frame to timeslots in a TDD frame and vice versa, thus avoiding the need to dissemble/re-assemble the data.

The intermediate end user system may not be able to directly communicate over a TDD with a terminal one of the user equipments, in which case the other end user equipment may include; a TDD transceiver for communicating with the intermediate user equipment and a second other user equipment over a TDD; and a TDD relay for relaying messages between the intermediate end user equipment and the second other user equipment.

The last hop to a terminal one of the other end user equipments may be via a short range technology link, such as intra-red, blue tooth or wireless LAN.

It may be possible to use end user equipments which subscribe to a network operator other than the network operator for the telecommunications network as the intermediate end user equipment. This provides a greater number of potentially available intermediate end user equipments.

According to a third aspect of the present invention there is provided a method of communicating messages in a telecommunications network comprising a base station, an intermediate user equipment and a terminal user equipment, wherein an outgoing message is communicated from the base station to the terminal end user equipment by the steps of; the base station sending an outgoing message to an intermediate end user equipment directly via a FDD downlink; the intermediate end user equipment receiving the outgoing message, storing the message and reconfiguring the message for transmission over a TDD; the intermediate end user equipment transmitting the reconfigured outgoing message over a TDD directly or indirectly to the terminal end user equipment; and/or wherein an incoming message is communicated from the terminal end user equipment to the base station by the steps of: the intermediate end user equipment receiving an incoming message directly or indirectly from the terminal end user equipment over a TDD; the intermediate end user system storing the incoming message and reconfiguring the message for transmission over a FDD link; and the intermediate end user system transmitting the reconfigured incoming message directly over a FDD to the base station.

The method according to the third aspect of the present invention has the same advantages as are described above in relation to the first and second aspects of the present invention.

The telecommunication services supported in a communication between the base station and a terminal or destination user equipment via an intermediate user equipment would be dependent on the service contract between the user of the terminal user equipment and the service provider.

A financial credit or a free call time credit may be allocated to an intermediate end user equipment for supporting a communication between the base station and a terminal or other user equipment. This would provide an incentive to an end user to keep their user equipment switch on in an FDD/TDD transceiving mode when it is not being used, so that the user equipment can be utilized by the telecommunications network for relaying messages.

Other aspects and features of the present invention will become apparent to those ordinarily skilled in the art upon review of the following description of specific embodiments of the invention in conjunction with the accompanying Figures.

BRIEF DESCRIPTION OF THE DRAWINGS

In order that the present invention is more fully understood and to show how the same may be carried into effect, reference shall now be made, by way of example only, to the Figures as shown in the accompanying drawing sheets, wherein.

DETAILED DESCRIPTION OF THE INVENTION

There will now be described by way of example the best mode contemplated by the inventor for carrying out the invention. In the following description, numerous specific details are set out in order to provide a complete understanding of the present invention. It will be apparent, however, to those skilled in the art that the present invention may be put into practice with variations of the specific.

Figure 1:
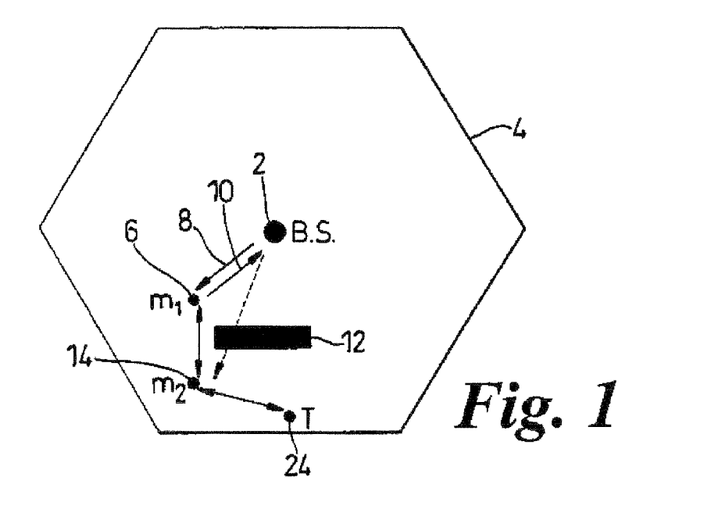
FIG. 1 shows a cell of a wireless telecommunications system according to the present invention having a frequency division duplex base station and showing the communication path between the base station and an end user terminal via two intermediate user equipment nodes.

FIG. 1 shows a cell of a wireless telecommunications network having a central base station (2) transmitting and receiving radio frequency (r f) signals over a geographical area or cell bounded by the hexagonal boundary (4) of theoretical equal signal strength with adjacent cells.

The network is made up of a plurality of such cells mosaiced over a wider geographical area, as is well known in the art.

In a typical 3G system two or three paired channels (10+10 MHz or 15+15 MHz) and one unpaired channel (5 MHz) will generally be available. The paired channels may be used for the FDD infrastructure and the unpaired channel may be used for TDD relay purposes according to the present invention. However, in the future more spectrum is likely to be available and could be split between FDD infrastructure and TDD relay in different ways.

The base station (2) transmits and receives signals to end user equipments, for example mobile end user equipment (6) over a frequency division duplex, for example using GSM, Code Division Multiple Access 2000 (CDMA2000) or Universal Mobile Telecommunications System (UMTS). The duplex comprises two channels (8, 10) of different frequencies and one channel (8) is utilized as the downlink for constantly carrying traffic, for example data or voice traffic, from the base station (2) to end user equipments within the cell, in particular mobile equipment (6). The other channel (10) of the duplex is utilized as the uplink for constantly carrying traffic from the end user equipments within the cell, in particular mobile equipment (6), to the base station.

Figure 2:
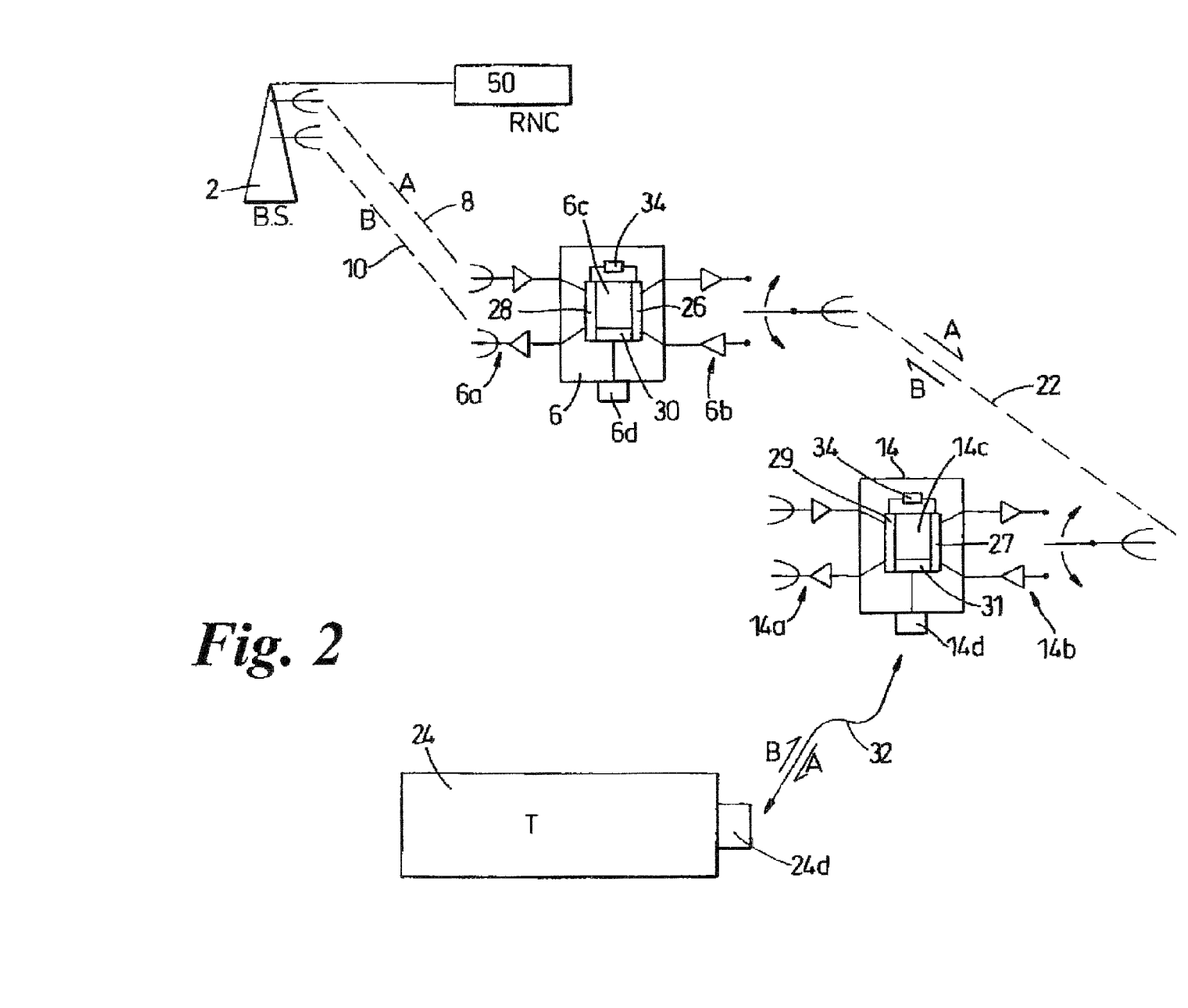
FIG. 2 shows the communication path shown in FIG. 1 in more detail.

According to the present invention, and as shown in FIG. 2, end user equipments (6, 14) are provided with a FDD transceiver arrangement (6a, 14a), a Time Division Duplex transceiver arrangement (6b, 14b), an infra-red, blue tooth or wireless LAN transceiver (6d, 14d) and a relay (6c, 14c). An interface or protocol dissembler/assembler (26 to 31) is provided between the relay (6c, 14c) and each of the transceivers for unpacking data packets from signals received by the relevant transceiver and packaging data packets into signals for transmission by the relevant transceiver.

It can happen that an obstacle, for example obstacle (12) can block the transmission of traffic over the FDD between the base station (2) and user equipments, in this example mobile user equipment (14) and nomadic end user equipment (24), located within the cell (4). However, according to the present invention, the base station (2) is able to transmit traffic to the user equipment (14) and/or user equipment (24) via a first hop end user or intermediate node comprising mobile user equipment (6) over a Time Division Duplex (TDD). The TDD is an additional channel having a different frequency from the channels of the FDD, and over which traffic can be transmitted alternately in two directions. The user equipments (6, 14, 24) may be a mobile equipment (6, 14), such as a mobile telephone, mobile computing device or Personal Digital Assistant (PDA) with interfaced FDD and TDD transceivers. Alternatively, the end user equipment may be a nomadic equipment, such as a terminal computing device (24), eg. a laptop computing device which is generally static while in use but which has a location which may change.

It is highly desirable that the data transmitted over the FDD and the TDD use the same basic coding, for example QPSK or 16-QAM and the same modulation, for example ⅓.sup.rd rate turbo code or ½ rate convolutional code. If this is the case then there is no need to assemble/dissemble data packets at the interface between the FDD and TDD. Instead a simple physical layer repackaging from FDD to TDD and vice versa should be sufficient.

Figure 3:
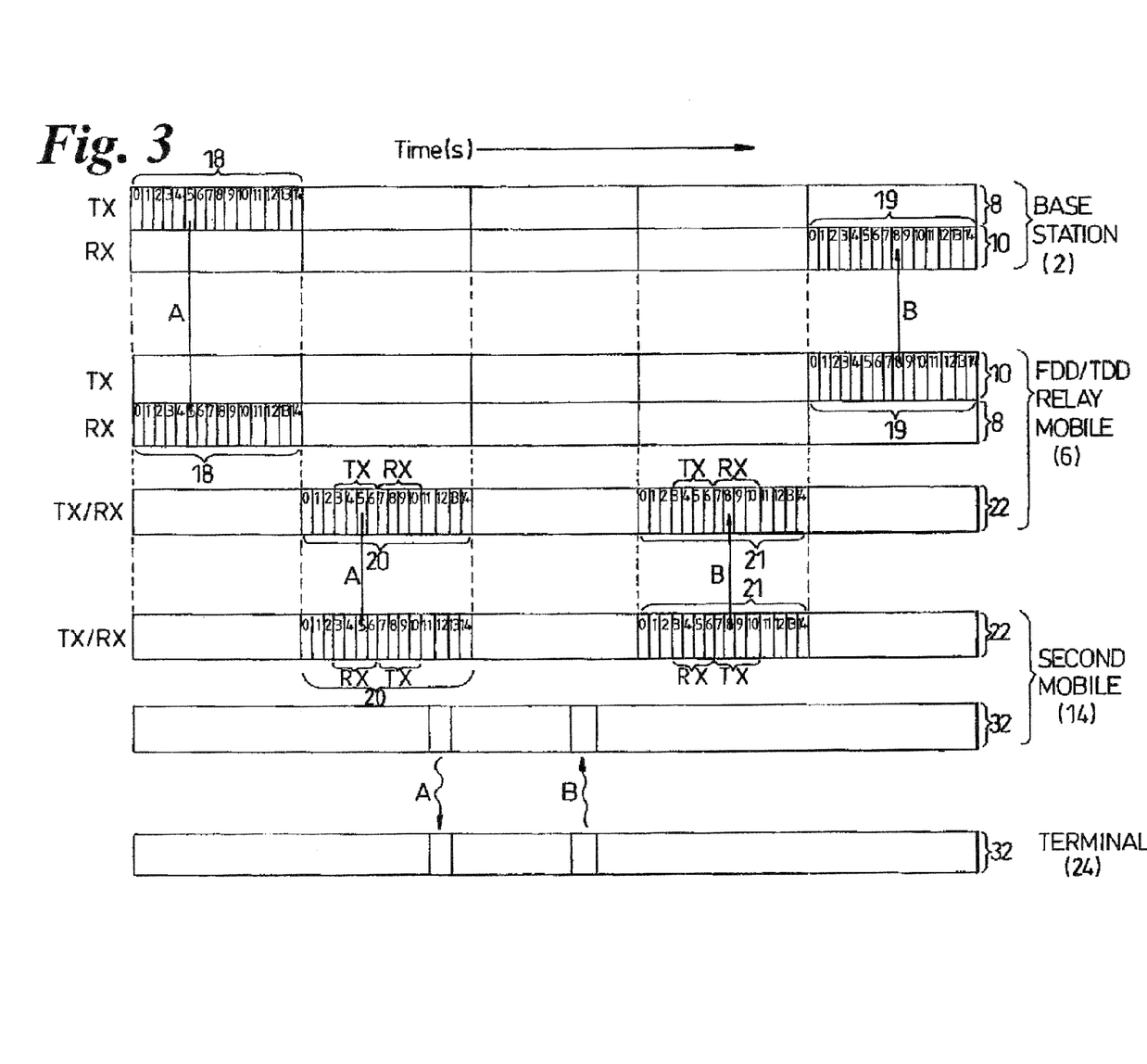
FIG. 3 shows schematically over time the synchronization of the frames transmitted and received by the base station, the intermediate end user nodes and the end user terminal.

FIG. 3 shows schematically, over a period of time, the frames (eg. 18, 19) in the FDD (8, 10) between the base station (2) and the mobile equipment (6) and how they are synchronized with the frames (eg. 20, 21) in the TDD (22) between the mobile equipment (6) and the mobile equipment (14). In the example shown in FIG. 3, each FDD frame has fifteen timeslots (0, 1, 2 . . . , 13, 14) and each TDD frame has fifteen timeslots (0, 1, 2 . . . , 13, 14). Then during time-slots (4, 5, 8, 9) a network controller or Radio Node Controller (50) schedules relaying in the part of the cell (4) within which the mobile equipment (6) is located, scheduling time slots (4, 5) for FDD/TDD downlink and slots (8, 9) for FDD/TDD uplink. The number and direction of slots allocated might depend, for example, on the priority of the user terminal (24), the amount of traffic to be passed up and down, the value of the transaction, the capability of the mobile equipment (6) acting as FDD/TDD relay and the likely estimated impact of interference on other relays.

The TDD and FDD frame structures are the same, as can be seen in FIG. 3. The TDD system has a ramp up and ramp down period associated with TDD transmissions. The controller (50) would be aware of this and would pack the FDD frame with data bits (for example in time slots (3, 6, 7, 10) that would be discarded due to ramp up and ramp down times. Ramp up/down is necessary to minimize out of band emissions (switching transients) and is a practical necessity in a radio frequency sub-system.

The frame structure need not be that described in relation to FIG. 3. The frame structure should have enough time slots to ensure sufficient flexibility of assignment, but not so many that the TDD peak power is too large. For example, between 8 and 20 timeslots per frame.

Referring now to both FIGS. 2 and 3, the base station (2) transmits a data packet (A) over the downlink (8) in FDD frame (18) in time slot 5 (in accordance with the scheduling from the network-controller (50)), which data packet (A) has a header which indicates that it is destined for the end user terminal (24). The signal carrying the data packet (A) is received by the receiver of the FDD transceiver (6a) of the first hop end user node, mobile equipment (6). The data packet (A) is unpacked from the signal received by the transceiver (6a) by the interface (28) and is then routed by the relay (6c), in accordance with the header of the data packet (A), to the interface (26) for transmission by the TDD transceiver (6b) of the mobile equipment (6). At the interface (26) the data packet (A) is packaged into a signal which is transmitted by the TDD transceiver (6b) in time slot 5 of frame (20) of a TDD (22). Note that there is a one-to-one mapping of the FDD timeslot 5 to the TDD timeslot 5, which avoids the need to disassemble/reassemble the data relayed. The data packet (A) is received by the TDD transceiver (14b) of the mobile equipment (14).

The FDD interface (28, 29) and the TDD interface (26, 27) of each mobile equipment (6, 14) are connected via a synchronization arrangement (34) so as to synchronize the FDD timeslots (eg. timeslots (18, 19)) which are transmitted over the FDD (8, 10) with TDD timeslots (eg. timeslots (20, 21)) which are transmitted over the TDD (22). The synchronization arrangement (34) may be a circuit, or an algorithm run on a digital signal processor, which maintains synchronization of the TDD frame structure with the FDD frame structure. Therefore, it is important for the execution of the present invention that the FDD system has a regular or at least deducible temporal structure. The synchronization arrangement (34) could work by using knowledge of the FDD access system and recognize the signaling when the start of an FDD frame occurs. This would be used to maintain an accurate clock with a periodicity equal to timeslots (or a multiple or sub-multiple thereof).

The signal carrying data packet (A) is received by the receiver of the TDD transceiver (14b) of the second hop end user node, mobile equipment (14). The data packet (A) is unpacked from the signal received by the transceiver (14b) by the interface (27) and is then routed by the relay (14c), in accordance with the header of the data packet (A), to the interface (31) for transmission by the infra-red, blue tooth or wireless LAN transceiver (14d) of the mobile equipment (14) At the interface (30) the data packet (A) is packaged into a signal which is transmitted by the transceiver (14d) over an infra-red, BLUETOOTH or wireless LAN link (32). The data packet (A) is received by the transceiver (24d) of the terminal end user equipment (24) The last hop, ie. between the user equipment (14) and the terminal (24) may use a short range technology, such as infra-red, BLUETOOTH or wireless LAN which will not interfere with the FDD or TDD channels operating within the cell (4).

For the end user terminal (24) to transmit a data packet (B) to the base station (2), the end user terminal would package the data packet in an infra-red, blue tooth or wireless LAN signal and transmit it via transceiver (24d) to the infra-red, blue tooth or wireless LAN transceiver (14d) of the mobile equipment (14) via the link (32). The data packet (B) is unpacked from the signal received by the transceiver (14d) by the interface (31) and is then routed by the relay (14c), in accordance with the header of the data packet (B), to the interface (27) for transmission by the TDD transceiver (14b) of the mobile equipment (14). At the interface (27) the data packet (B) is packaged into a signal which is transmitted by the TDD transceiver (14b) over time slot 8 of frame (21) of the TDD (22). The data packet (B) is received by the TDD transceiver (6b) of the mobile equipment (6). The data packet (B) is unpacked from the signal received by the TDD transceiver (6b) by the interface (26) and is then routed by the relay (6c), in accordance with the header of the data packet (B) to the interface (28) for transmission by the FDD transceiver (6a) of the mobile equipment (6). At the interface (28) the data packet (B) is packaged into a signal which is transmitted by the FDD transceiver (6a) in time slot 8 of frame (19) of the uplink channel (10) of the FDD. Again it should be noted that there is a one-to-one mapping of the TDD timeslot 8 to the FDD timeslot 8, which can avoid the need for dissembling/reassembling the data packet. The signal carrying the data packet (B) is received by the base station (2).

The network controller or Radio Node Controller (50) controls the transmissions in a number of cells, including cell (4). The controller (50) controls the transmissions over TDDs (22) within the cell (4) and in adjacent cells, in order to prevent interference between TDD transmissions on the same channel within the cell or between adjacent cells. As described above the TDD time slots (20, 21) over which traffic is transmitted between user equipments (6, 14) within the cell (4) are synchronized with the FDD time slots (18, 19) over which traffic is transmitted between the base station (2) and user equipments (6), as is described above. This means that all TDDs generated between user equipments within the cell (4) will have time slots which are synchronized with each other. The controller (50) can allocate different TDD time slots on a TDD channel to different user equipments located in the cell (4) in order to avoid interference between transmission over the TDDs in the cell (4). For example, according to FIG. 3, the mobile equipment (6) is allocated time slots (3 to 10).

In the example given above in relation to FIG. 3, the FDD and TDD timeslots have a one-to one mapping, with each TDD and each FDD frame having fifteen time slots (0 to 14). The end user equipment (6), with which the base station (2) communicates directly over the FDD (8, 10) is instructed by the base station (2) to make TDD transmissions on time slots (4, 5, 8, 9) only. The mobile equipment (6) when starting a communication with a second hop user equipment, such as mobile equipment (14), will inform that user equipment of the TDD time slot structure and on which time slots the second hop user equipment can transmit signals and expect to receive signals. Therefore, as can be seen from FIG. 3, after the mobile equipment (6) receives the data packet (A) in the FDD frame (18) on timeslot 5 it waits for a timeslot 4 or 5 on a subsequent frame (20) on the TDD (22) to transmit a signal carrying the data packet (A). Similarly, when the mobile equipment (6) receives the data packet (B) over the link (32)

it waits for a time slot 8 or 9 of a subsequent frame (21) on the TDD (22) to transmit a signal carrying the data packet (B).

Figure 4A:
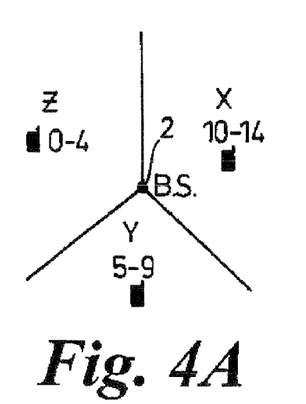
FIG. 4a shows schematically a first scheme for allocating time slots in a time division duplex frame to first hop intermediate end user nodes in the cell of FIG. 1.

Referring to FIG. 4A, which shows the cell (4), with the base station (2) at its centre, split into three sectors. One TDD channel is allocated to the cell (4). According to the scheme in FIG. 4A, a first hop user equipment in the first sector (X) is allocated TDD time slots (10, 11, 12, 13, 14) for transmissions over the TDD channel, a first hop user equipment in the second sector (Y) is allocated the TDD time slots (5, 6, 7, 8, 9) and a first hop user equipment in the third sector (Z) is allocated the TDD time slots (0, 1, 2, 3, 4). By allocating different TDD time slots to the different end user equipments in the cell (4) interference between the TDD transmissions made by the end users in the cell is prevented.

Figure 4B:
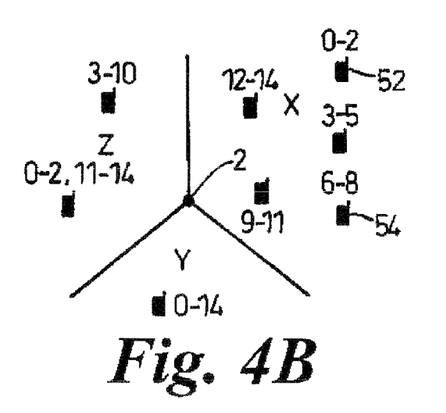
FIG. 4b shows schematically a second scheme for allocating time slots in a time division duplex frame to first hop intermediate end user nodes in the cell of FIG. 1.

Referring to FIG. 4B, here each of the time slots (0 to 14) is used in each sector (X, Y, Z). In the first sector (X) there are five first hop user equipments which are each allocated three of the fifteen TDD time slots. In the second sector (Y) there is one first hop user equipment which allocated all of the fifteen TDD time slots. In the third sector (Z) there are two first hop user equipments one of which (which could be the mobile user equipment (6) described above in relation to FIGS. 2 and 3) is allocated time slots (3 to 10) and the other of which is allocated the remaining time slots (0 to 2 and 11 to 14). As the sectors are geographically separate this should prevent interference between TDD transmissions within the cell (4), although there is the possibility of interference between user equipments using allocated the same TDD time slots at a boundary between the sectors (X, Y, Z).

Figure 4C:
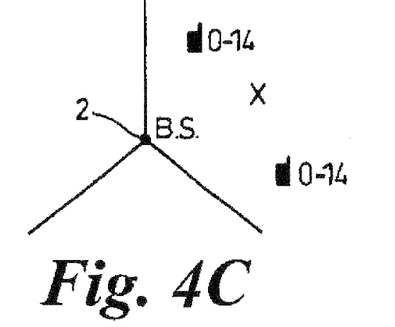
FIG. 4c shows schematically a third scheme for allocating time slots in a time division duplex frame to first hop intermediate end user nodes in the cell of FIG. 1.

In FIG. 4C it is assumed that the network controller (50) has knowledge of the location of each user equipment, and where user equipments are adequately geographically spaced, the controller (50) will allocate the same TDD time slots to the user equipments. For example, in the first sector (X) there are two first hop user equipments, which are adequately geographically spaced and the controller (50) allocates all of the fifteen TDD time slots to each of the user equipments in the first sector (X).

The users of the intermediate mobile equipments (6, 14) via which the data packets (A, B) are sent between the base station and the end user terminal (24) are not charged for the cost of the call to the terminal (24). The user of the terminal (24) is charged for the cost of the call, based on its contract with its service provider. The facilities of the intermediate mobile equipments (6, 14) made available for the call to the terminal (24) will also be dependent on the contract between user of the terminal (24) and its service provider and not on the contract between the users of the intermediate equipments (6, 14) and their service providers. However, the use of the intermediate equipments (6, 14) to transmit data to and from the terminal (24) will consume power from the intermediate equipment, which will for example reduce the battery run down time of the intermediate equipment. Therefore, an incentive can be offered to users, so that they allow their equipments to be used as intermediate mobile equipments and so that they keep their mobile equipments switch on in a transceiving mode so that their equipments are available for the maximum time. As an example, for each unit of time a user equipment is used as an intermediate hop for a call to another equipment, the user equipment could be credited with an equivalent number of time units, or a fraction of the number of time units, for free use of their user equipment to make calls. Alternatively, an equivalent cash sum could be credited to the account of the end user of the user equipment.

The data transmitted to a destination terminal (24) via intermediate terminals (6, 14) would be encoded such that the data transmitted could not be decoded by the intermediate terminals (6, 14) and the user of the intermediate terminal would not be able to determine the identification of the destination terminal (24). To achieve this the data would be encoded and ciphering used end-to-end of the connection to the terminal (24). The end user SIM (or UMTS-SIM) of the destination terminal (24) provides the identification of the user the data is intended for.

In a first proposed arrangement, if a user equipment, for example a destination or terminal mobile equipment (14) cannot 'see' the FDD base station (2), then it sends an 'Anyone out there?' message via its TDD transceiver (14b). The message would include the user identification of the destination mobile equipment (14). This message is initially sent out at a low power that increases in steps until a prescribed power limit is reached. The 'Anyone out there?' message would use only the most basic protocols and modulation techniques which all user equipments suitable as relays would share. A 'helpful' intermediate user equipment is an user equipment which can receive the TDD transmission from the destination equipment (14) and which is in direct FDD communication or indirect TDD/FDD communication with a base station (2). The user equipment (14) sending the 'Anyone out there?' message and the helpful user equipment would exchange capabilities so as to optimize any link between them.

When a 'helpful' intermediate user equipment, such as mobile equipment (6), is not in an FDD call, it will periodically scan the TDD band for the cell (4) using the transceiver (6b). If it receives the 'Anyone out there message?' from the destination equipment (14) then the intermediate equipment (6) sends an acknowledgement to the destination equipment (14). The acknowledgement process would entail an exchange of capabilities and would be similar to the process that would occur in a normal network when a user equipment comes into coverage. The destination equipment (14) then stops probing for additional user equipments. The intermediate user equipment (6) passes a message to the base station (2) to indicate that it has established a TDD communication with the destination equipment (14). The base station (2) then registers the location of the destination equipment (14) on the network.

The 'Anyone out there?' message transmitted by the destination equipment (14) could be encoded to permit the system to determine path loss between the equipments (6) and (14). This could then be used for power control between the intermediate user equipment (6) and the destination equipment (14) over the TDD (22).

As an alternative to or in addition to the out of range destination mobile user equipment sending out random access probes it may be preferable for the network controller (50) to request certain mobile user equipments, such as equipment (6), with which it can communicate directly to transmit 'Anyone out there?' signals in predetermined time slots. For example, considering sector (X) of FIG. 4B, each of the five first hop mobile user equipments in the sector might be allocated one time slot per frame on which to transmit an 'Anyone out there?' message. For example, equipment (52) could be allocated slot 1, equipment (54) could be allocated slot 7, etc. The 'Anyone out there?' message could, for example, be a regular pattern of RF pulses recognizable to user equipments subscribing to the network as an indication of an available TDD time slot. A destination end user equipment, for example mobile equipment (14), not able to directly communicate with the base station (2) and requiring service, could monitor the TDD relay band looking for an 'Anyone out there?' message indicating available TDD time slots. The destination equipment (14) could then roughly synchronize with the pulse pattern of the 'Anyone out there?' message and send back a reply over the TDD channel a predetermined number of time slots later (the predetermined number being selected not to coincide with a transmission on the TDD channel by the first hop user equipment (6)). A similar process as described above could be utilized for exchanging capabilities between the two equipments (6, 14) leading to the setting up of a call or session.

The present invention could also utilize user equipments subscribing to a different network. A user equipment, for example user equipment (6) subscribing to a network A could temporarily connect to a different network B and act as an FDD/TDD relay between a base station (2) of the network B and an end user (14) who has a subscription with operator B.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. Intermediate equipment for use in a communication network, the communication network including at least one base station and at least one end user equipment, the intermediate equipment comprising:
    a frequency division duplex (FDD) transceiver configured to communicate directly with at least one base station over a FDD channel;
    a time division duplex (TDD) transceiver configured to communicate with at least one end user equipment over a TDD channel; and
    an interface configured to interface the FDD channel with the TDD channel to establish a communication link between the base station and the end user equipment, the FDD channel and the TDD channel employing a common coding scheme and a common frame structure.

2. The intermediate equipment of claim 1, wherein the FDD channel and the TDD channel employ a common modulation scheme.

3. The intermediate equipment of claim 1, wherein the interface comprises:
    a FDD to TDD relay configured to:
        prepare messages received by the FDD transceiver for re-transmission over the TDD channel; and
        forward the prepared messages to the TDD transceiver; and
    a TDD to FDD relay configured to:
        prepare messages received by the TDD transceiver for re-transmission over the FDD channel; and
        forward the prepared messages to the FDD transceiver.

4. The intermediate equipment of claim 1, wherein the interface comprises a synchronizer configured to synchronize transmission of frames over the TDD channel with transmission of frames over the FDD channel.

5. The intermediate equipment of claim 1, wherein the interface comprises a synchronizer configured to synchronize time slots in a FDD frame with time slots in a TDD frame.

6. The intermediate equipment of claim 1, further comprising a wireless transceiver coupled to the TDD transceiver, the wireless transceiver being selected from a group consisting of an infra-red transceiver, a BLUETOOTH transceiver and a wireless local area network (LAN) transceiver, the wireless transceiver being configured to communicate with the end user equipment.

7. The intermediate equipment of claim 1, further comprising end user equipment registration logic configured to:
    scan the TDD channel for a message from the end user equipment;
    send an acknowledgement of the message to the end user equipment; and
    send a message to the base station over the FDD channel to register the end user equipment with the base station.

8. The intermediate equipment of claim 1, wherein the intermediate equipment is configured as end user equipment.

9. A method of operating intermediate equipment in a communication network, the communication network including at least one base station and at least one end user equipment, the method comprising:
    communicating directly with at least one base station over a frequency division duplex (FDD) channel;
    communicating with at least one end user equipment over a time division duplex (TDD) channel; and
    interfacing the FDD channel with the TDD channel to establish a communication link between the base station and the end user equipment, the FDD channel and the TDD channel employing a common coding scheme and a common frame structure.

10. The method of claim 9, wherein the FDD channel and the TDD channel employ a common modulation scheme.

11. The method of claim 9, further comprising synchronizing transmission of frames over the TDD channel with transmission of frames over the FDD channel.

12. The method of claim 9, further comprising synchronizing time slots in a FDD frame with time slots in a TDD frame.

13. The method of claim 9, further comprising communicating with the end user equipment via a wireless transceiver coupled to the TDD transceiver, the wireless transceiver being selected from a group consisting of an infra-red transceiver, a BLUETOOTH transceiver and a wireless local area network (LAN) transceiver.

14. The method of claim 9, further comprising:
    scanning the TDD channel for a message from the end user equipment;
    sending an acknowledgement of the message to the end user equipment; and
    sending a message to the base station over the FDD channel to register the end user equipment with the base station.

15. An end user equipment for use in a communication network including at least one base station and at least one intermediate equipment, the end user equipment comprising:
    a frequency division duplex (FDD) transceiver configured to communicate directly over a FDD channel with a base station when the end user equipment is within a FDD coverage area of the FDD channel;
    a time division duplex (TDD) transceiver configured to communicate over a TDD channel with an intermediate equipment when the end user equipment is not within the FDD coverage area of the FDD channel and is within a coverage area of the TDD channel, the FDD channel and the TDD channel employing a common coding scheme and a common frame structure.

16. The end user equipment of claim 15, wherein the FDD channel and the TDD channel employ a common modulation scheme.

17. The end user equipment of claim 15, further comprising a wireless transceiver coupled to the TDD transceiver, the wireless transceiver being selected from a group consisting of an infra-red transceiver, a BLUETOOTH transceiver and a wireless local area network (LAN) transceiver, the wireless transceiver being configured to communicate with the intermediate equipment.

18. The end user equipment of claim 15, further comprising an interface configured to interface the FDD channel with the TDD channel such that the end user equipment is configured as an intermediate station to establish a communication link between the base station and another end user equipment.

19. The end user equipment of claim 18, wherein the interface includes a synchronizer configured to synchronize transmission of frames over the TDD channel with transmission of frames over the FDD channel.

20. The end user equipment of claim 18, wherein the interface includes a synchronizer configured to synchronize time slots in a FDD frame with time slots in a TDD frame.

21. A method of operating end user equipment in a communication network, the communication network including at least one base station and at least one intermediate equipment, the method comprising:
communicating directly over a frequency division duplex (FDD) channel with a base station when the end user equipment is within a coverage area of the FDD channel;
communicating over a time division duplex (TDD) channel with an intermediate equipment when the end user equipment is not within the coverage area of the FDD channel and is within a coverage area of the TDD channel, the FDD channel and the TDD channel employing a common coding scheme and a common frame structure.

22. The method of claim 21, wherein the FDD channel and the TDD channel employ a common modulation scheme.

23. The method of claim 21, further comprising interfacing the FDD channel with the TDD channel such that the end user equipment is configured as an intermediate station to establish a communication link between the base station and another end user equipment.

24. The method of claim 23, further comprising synchronizing transmission of frames over the TDD channel with transmission of frames over the FDD channel.

25. The method of claim 23, further comprising synchronizing time slots in a FDD frame with time slots in a TDD frame.

* * * * *